United States Patent [19]

Beck et al.

[11] 4,274,127
[45] Jun. 16, 1981

[54] VEHICLE SAFETY ILLUMINATION DEVICE

[76] Inventors: Blaine E. Beck, Redfox Rd., Rt. 2, Camden, S.C. 29020; Charles J. Corris, 2924 Aintree Dr., Columbia, S.C. 29206

[21] Appl. No.: 694,217
[22] Filed: Jun. 9, 1976
[51] Int. Cl.² .............................................. B62J 5/00
[52] U.S. Cl. .................................................. 362/72
[58] Field of Search .................... 240/755, 6.42, 1 LP, 240/1 EL; 362/72

[56] References Cited

U.S. PATENT DOCUMENTS

| 2,601,554 | 6/1952 | Peters | 240/6.42 |
|---|---|---|---|
| 3,641,332 | 2/1972 | Reick | 240/1 LP |
| 3,862,410 | 1/1975 | Maxwell | 240/7.55 |
| 3,890,497 | 6/1975 | Rush | 240/7.55 |

FOREIGN PATENT DOCUMENTS

| 834837 | 3/1952 | Fed. Rep. of Germany | 240/1 EL |
|---|---|---|---|
| 1325014 | 3/1963 | France | 240/1 EL |
| 664193 | 1/1952 | United Kingdom | 240/1 EL |

Primary Examiner—Monroe H. Hayes

[57] ABSTRACT

A safety illumination device is provided for a wheeled vehicle such as a bicycle comprising a lamp housing and lamp member carried by a pole member extending above the frame of the vehicle and attached thereto wherein an optic rod member is carried in light receiving relationship with the lamp housing so that light admitted from the lamp causes the rod member to be uniformly illuminated on its length producing a highly visible safety light.

4 Claims, 3 Drawing Figures

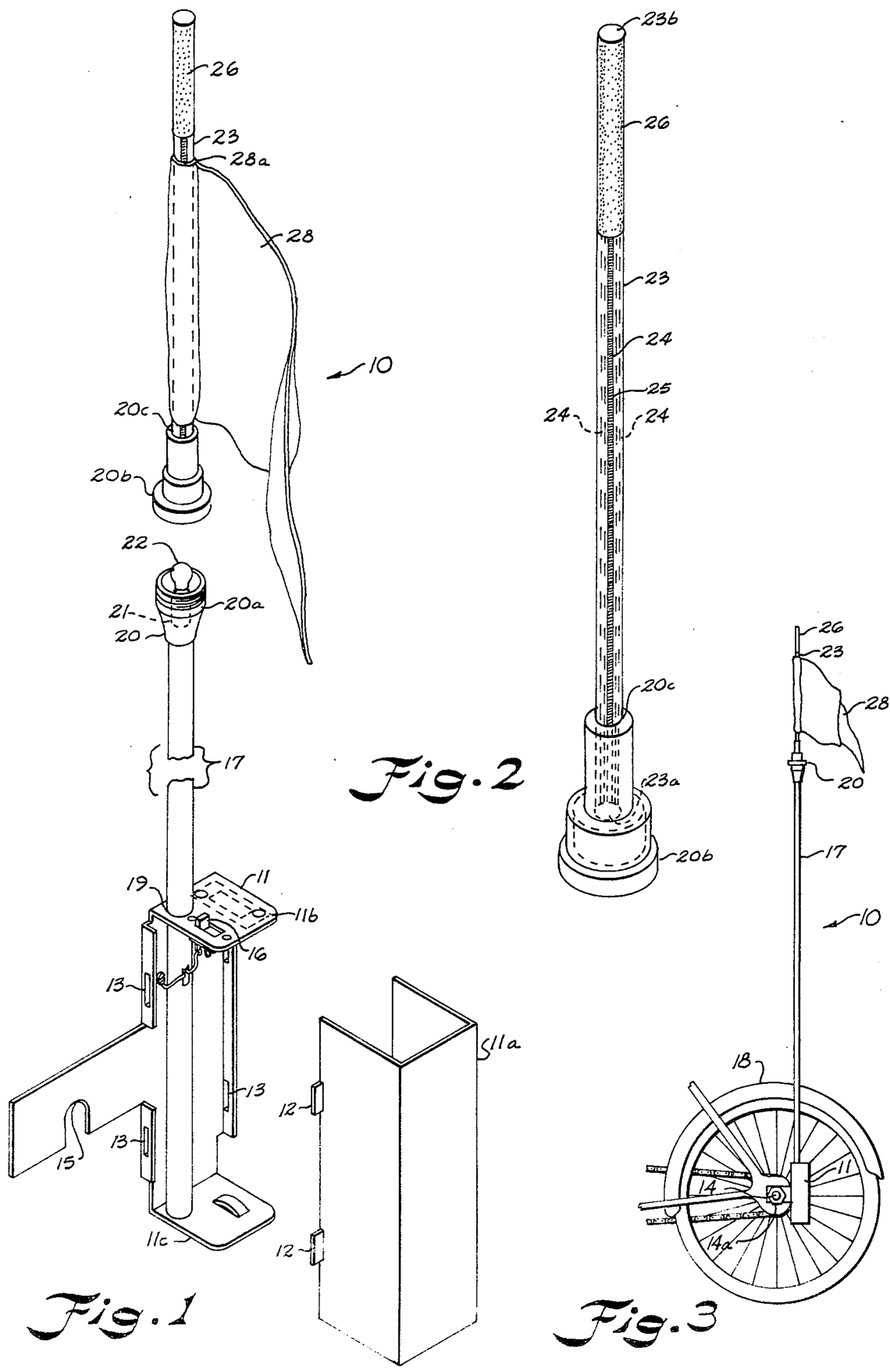

VEHICLE SAFETY ILLUMINATION DEVICE

BACKGROUND OF THE INVENTION

Due to the increasing number of bicycles and motorcycles being utilized on the highways and roads, the provision of adequate safety devices for detecting such a vehicle by oncoming traffic is a problem to which considerable attention need be given. Prior devices have been utilized wherein a safety device such as a flag or light is carried adjacent an upper portion of a pole member attached to the vehicle.

Devices which utilize a safety or warning light are disclosed in U.S. Pat. Nos. 3,862,410 and 3,916,377 wherein a lamp member contained in a lamp housing is carried adjacent an upper portion of a pole member mounted on and extending above the vehicle frame. While both of these devices utilize a flashing lamp to increase the visibility thereof, the size of the lamp and thus the amount of illumination produced thereby is limited. This is due to the fact that the pole member which is usually a flexible pole member can support only such so much weight without becoming unstable and unwieldy and, hence, the size of the lamp housing must be limited.

SUMMARY OF THE INVENTION

A safety illimination device for a multi-wheeled vehicle comprises a housing member for being carried by the vehicle constructed for receiving and containing a source of power. A hollow pole member extends from the housing so as to extend generally vertically above a portion of the vehicle frame. A translucent lamp housing is carried by an upper portion of the pole member. A lamp socket is carried in the lamp housing for holding a lamp for emitting a light when operatively connected to the power source. An elongated rod member is carried by the lamp housing and extends generally upwardly therefrom having an end surface disposed in light receiving relationship with the light emitted by the lamp. The rod member is provided with optical properties so that light from said lamp causes said rod member to be illuminated substantially uniformly over its length providing an extended source of illumination having increased visibility.

Accordingly, it is an important objective of the present invention to provide a vehicle safety light device having an increased illumination surface producing a highly visible safety light.

Yet another object of the present invention is to provide a safety illumination device for a vehicle wherein an extended surface of illumination is provided for increased visibility while maintaining a lightweight highly manageable configuration for the device capable of withstanding high dynamic and wind forces.

Still another important object of the present invention is to provide a safety illumination device for a vehicle wherein the lamp housing which houses the illumination source is provided with an extended optic rod member in light receiving relationship with the illumination source so that the rod member is uniformly illuminated along its extended length.

Yet another important object of the present invention is to provide an elongated rod member carried by a lamp housing containing a vehicle safety light wherein the rod member is provided with optical properties so that light from the safety light causes the rod member to be illuminated uniformly over its length producing an increased surface of illumination and a highly visible safety light.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIG. 1 is a perspective view illustrating the various components of a vehicle safety illumination device as constructed in accordance with the present invention, FIG. 2 is a perspective view illustrating an optic rod member and lamp housing member of the vehicle safety illumination device as constructed in accordance with the present invention, and FIG. 3 is a side elevation view illustrating a vehicle safety illumination device constructed in accordance with the present invention attached to a frame portion of a wheeled vehicle.

DESCRIPTION OF A PREFERRED EMBODIMENT

The safety illumination device constructed in accordance with the present invention has application to wheeled vehicles and particularly to a bicycle, motorcycle, and the like. The illumination device of the present invention provides a highly effective and visible safety device for both day and night time traveling when used with a safety flag. The illumination device has particular advantage for safety in night time traveling due to the highly effective and visible safety light produced thereby.

Referring now in more detail to the drawing, the illuminated safety device constructed in accordance with the present invention is shown generally at 10. The device includes a housing member 11 for receiving and containing a source of power which is preferably a pair of size "D" dry cell batteries carried in series. The housing member further includes a front cover member 11a which may be attached to the battery housing 11 in any suitable manner such as by tabs 12 inserted within slots 13 formed within the battery housing 11. The housing member 11 is preferably mounted to the vehicle frame such as a bicycle frame by attachment to the rear axle 14 of the bicycle and secured thereto by the existing anxle nut 14a. For this purpose a U-shaped slot 15 is provided in housing 11 for being received over the rear axle. A conventional on-off switch 16 is provided for operatively connecting the battery source of power to a source of illumination in a conventional manner.

A hollow pole member 17 extends upwardly from the housing 11 so as to extend generally vertically above a portion of the vehicle frame 18 so as to be highly visible. The pole member 17 is preferably received through a substantially circular opening 19 formed in an upper flange plate 11b of the housing and is secured to a bottom flange plate 11c in any suitable manner such as gluing or by inserting a tappet screw through the bottom of the flange plate 11b. In this manner the pole member 17 can be carried securely by the housing 11 which is in turn carried by the vehicle.

Carried adjacent an upper end of the pole member 17 is a translucent miniature lamp housing 20 having a conventional lamp socket 21 carried therein. The lamp housing preferably includes a lower housing member 20a and an upper housing 20b which is threadably received over and on the lower housing member 20a.

A lamp member 22 is received in the lamp socket 21 for emitting light when operatively connected to the battery power source contained within the housing 11. The lamp 22 may be a flashing type lamp bulb or a constant illumination type providing a source of illumination. The lamp housing 20 is preferably constructed of a translucent red plastic. The pole member 17 is preferably a hollow plastic pole of approximately four and one-half foot length wherein the wires connecting the battery power source to the lamp socket and lamp member 22 are received in the hollow portion of the pole.

Received within an opening of a circular flange 20c of the upper lamp housing member 20b is an elongated rod member 23 carried in light receiving relationship with the light emitted by the lamp 22. The rod member 23 may be secured within the flange 20c in any suitable manner such as by gluing. The rod member 23 extends generally upwardly from the lamp housing and is preferably constructed of an approximately twelve inch length of a solid Lucite plastic rod. The end surface 23a of the optic rod 23 is polished to enhance the light transmission capability of the rod member 23. The end surface 23a is positioned in the flange 20c just above the lamp 22. The rod member 23 is optically constructed so that light from the lamp member 22 is transmitted and transferred through the rod and outwardly to the surface thereof causing said rod member to be illuminated substantially uniformly over its length providing an extended source of illumination for the safety device having a high degree of visibility. The rod 23 may be clear or a translucent color. Of course, it is to be understood that other suitable translucent or optic plastics may be utilized other than Lucite.

A plurality of longitudinal grooves 24 are formed in the outer surface of the rod member 23. Preferably there are three such grooves spaced circumferentially 120 degrees around the rod periphery. Each groove has a plurality of substantially parallel and horizontal serrations 25 formed in the groove 24 for enhancing the light transmission capabilities and properties of the rod member 23. The grooves 24 are formed by a broaching tool producing a series of serrations or teeth that act to transmit or carry the light along the axial length of the rod member 23.

An upper portion 26 of the rod member including approximately the upper two inches of the rod member has a frosted surface which is preferably broken by sanding circumferentially in order to contain the light transmitted axially through the rod member 23 at the upper top portion 26 of the rod. This causes the light to be contained within the rod member 23 preventing such light from escaping out of the top of the rod and bringing the light out to the surface at the upper portion 26 of the rod. The upper end 23b of the rod member may also be sand polished or frosted for retaining the light. Therefore, the entire length of the elongated rod member 23 is illuminated substantially uniformly.

A standard safety flag 28 may be carried on the rod member 23 as best seen in FIG. 1. The safety flag 28 would be formed from the standard international orange safety color whereby the loop portion 28a received around the rod member 23 would be uniformly illuminated in an international orange color when the lamp member 22 is energized.

The rod member 23 may also be optically engineered to produce a uniform illumination along its length by scribing a spiral on its outer surface from the upper lamp housing 20b to the frosted portion 26. The spiral may be scribed approximately one-sixteenth of an inch wide having one twist per two inches of length. Such a spiral groove enchances the transmission of light axially through the rod to produce a uniform light along its length. However, it has been found that the broached grooves 24 produce the best transmission and transfer of light along the length of the rod.

Thus, it can be seen that an advantageous construction for a vehicle safety illumination device can be had in accordance with the present invention. The optic rod member 23 having an elongated length extending above the lamp housing 20 provides an extended source of illumination which is highly visible. At the same time, the combination lamp housing 20 and rod member 23 providing the extended surface of illumination does so without creating an unstable and unwieldly combination which could result from increasing the lamp and lamp housing size. The result is a much more highly effective and visible safety illumination device for a wheeled vehicle than the prior devices which have utilized a lamp in a lamp housing producing only a limited source of illumination. However, high stability and manageability has not been sacrificed in the configuration of the device of the present invention. Thus, the device constructed in accordance with the present invention may be utilized on a high speed vehicle such as a motorcycle without yielding to wind and other dynamic forces.

While a preferred embodiment of the invention has been described using specific terms, such description is for illustrative purposes only, and it is to be understood that changes and variations may be made without departing from the spirit or scope of the following claims.

What is claimed is:

1. An illumination device for a multi-wheeled venicle comprising:
    a housing member for being carried by said vehicle;
    said housing member constructed for receiving and containing a source of power;
    a hollow pole member extending from said housing so as to extend generally vertically above a vehicle frame member;
    a translucent lamp housing carried by said pole at an upper end portion thereof substantially above said vehicle frame;
    a lamp socket carried in a lower portion of said lamp housing for holding a lamp for emitting a light when operatively connected to said power source;
    an elongated optic rod member carried by an upper portion of said lamp housing in light receiving relationship with light emitted by said lamp;
    said rod member including a plurality of circumferentially spaced light transferring grooves, each said groove having a plurality of spaced serrations formed in an outer surface along the length thereof for transferring light received from said lamp along the length of said rod member providing a solidly illuminated rod; and
    a frosted upper surface formed adjacent a remote end of said rod member for containing said light to illuminate said rod member substantially uniformly over its length providing an extended source of illumination having increased visibility.

2. The device as set forth in claim 1 wherein said rod member comprises a solid optic rod having a polished end surface for increasing the transmission of light therethrough disposed in light receiving relationship with said light.

3. The device as set forth in claim 1 wherein said longitudinal grooves are spaced circumferentially around the outer surface of said rod member approximately one-hundred and twenty degrees apart.

4. The device as set forth in claim 1 wherein said device further includes a safety flag carried by said rod member between said lamp housing and said frosted surface.

* * * * *